US010207419B2

(12) United States Patent
Harder et al.

(10) Patent No.: US 10,207,419 B2
(45) Date of Patent: Feb. 19, 2019

(54) COMBINED FOOD CUTTING AND ROUNDING MACHINE AND METHOD OF CUTTING AND ROUNDING FOOD

(71) Applicant: General Mills, Inc., Minneapolis, MN (US)

(72) Inventors: Zac Harder, Crystal, MN (US); Rodney McCalley, Eden Prairie, MN (US); Christopher E. Fournier, East Bethel, MN (US); Ralph A. Stenvik, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 187 days.

(21) Appl. No.: 15/086,996

(22) Filed: Mar. 31, 2016

(65) Prior Publication Data

US 2017/0282396 A1    Oct. 5, 2017

(51) Int. Cl.
*A21C 7/06* (2006.01)
*A21C 3/10* (2006.01)
*B26D 7/27* (2006.01)
*A23P 30/20* (2016.01)
*A47J 44/00* (2006.01)
*B26D 1/28* (2006.01)
*A21C 3/06* (2006.01)

(52) U.S. Cl.
CPC ............... *B26D 7/27* (2013.01); *A23P 30/20* (2016.08); *A47J 44/00* (2013.01); *B26D 1/28* (2013.01); *A21C 3/06* (2013.01); *A21C 3/10* (2013.01); *A21C 7/06* (2013.01); *B26D 2210/02* (2013.01)

(58) Field of Classification Search
CPC ..... A21C 7/06; A21C 3/06; A21C 3/10; A47J 44/00; A23P 30/20
See application file for complete search history.

(56) References Cited

U.S. PATENT DOCUMENTS

| 2,572,262 A | 10/1951 | Hibbard |
| 4,796,818 A | 1/1989 | Thoma |
| 5,673,863 A | 10/1997 | Pallmann |

(Continued)

OTHER PUBLICATIONS https://www.youtube.com/watch?v=kBWAUG3LckQ.
(Continued)

*Primary Examiner* — Seyed Masoud Malekzadeh
(74) *Attorney, Agent, or Firm* — Diederiks & Whitelaw, PLC; Gregory P. Kaihoi, Esq.

(57) ABSTRACT

A combined food cutting and rounding machine comprises a supply opening through which edible material passes, a stator located adjacent the supply opening and a rotor configured to rotate relative to the stator. The stator includes a stator forming channel. The rotor includes a plurality of rotor forming channels and a plurality of blades, at least one of the plurality of blades being located adjacent to each of the plurality of rotor forming channels. The stator forming channel and each of the plurality of rotor forming channels are arcuate in length. The supply opening, stator and rotor are configured such that, during operation as the rotor rotates relative to the stator, edible material exiting the supply opening is cut by one of the plurality of blades and formed into a ball by simultaneous contact with the stator forming channel and one of the plurality of rotor forming channels.

21 Claims, 9 Drawing Sheets

(56) References Cited

U.S. PATENT DOCUMENTS

| | | | |
|---|---|---|---|
| 6,460,444 B2 | 10/2002 | Jacko | |
| 6,767,198 B2 | 7/2004 | Weinstein et al. | |
| 9,131,701 B2 * | 9/2015 | Meade | A21C 7/00 |
| 2002/0170991 A1 | 11/2002 | Prewitt et al. | |
| 2010/0119678 A1 * | 5/2010 | Sammel | A22C 17/0033 |
| | | | 426/518 |

OTHER PUBLICATIONS https://www.youtube.com/watch?v=a9A3LpJkIIA.
https://www.youtube.com/watch?v=zbjlgwBN_yA.
https://www.youtube.com/watch?v=B4xXlflPULQ.
http://www.kands.org/en/arm-0252.html.
http://www.youtube.com/watch?v=J50BEt4BVGY.
http://www.rheon.com/en/products/?id=36.
https://www.youtube.com/watch?v=fBDuFViDDD8.

* cited by examiner

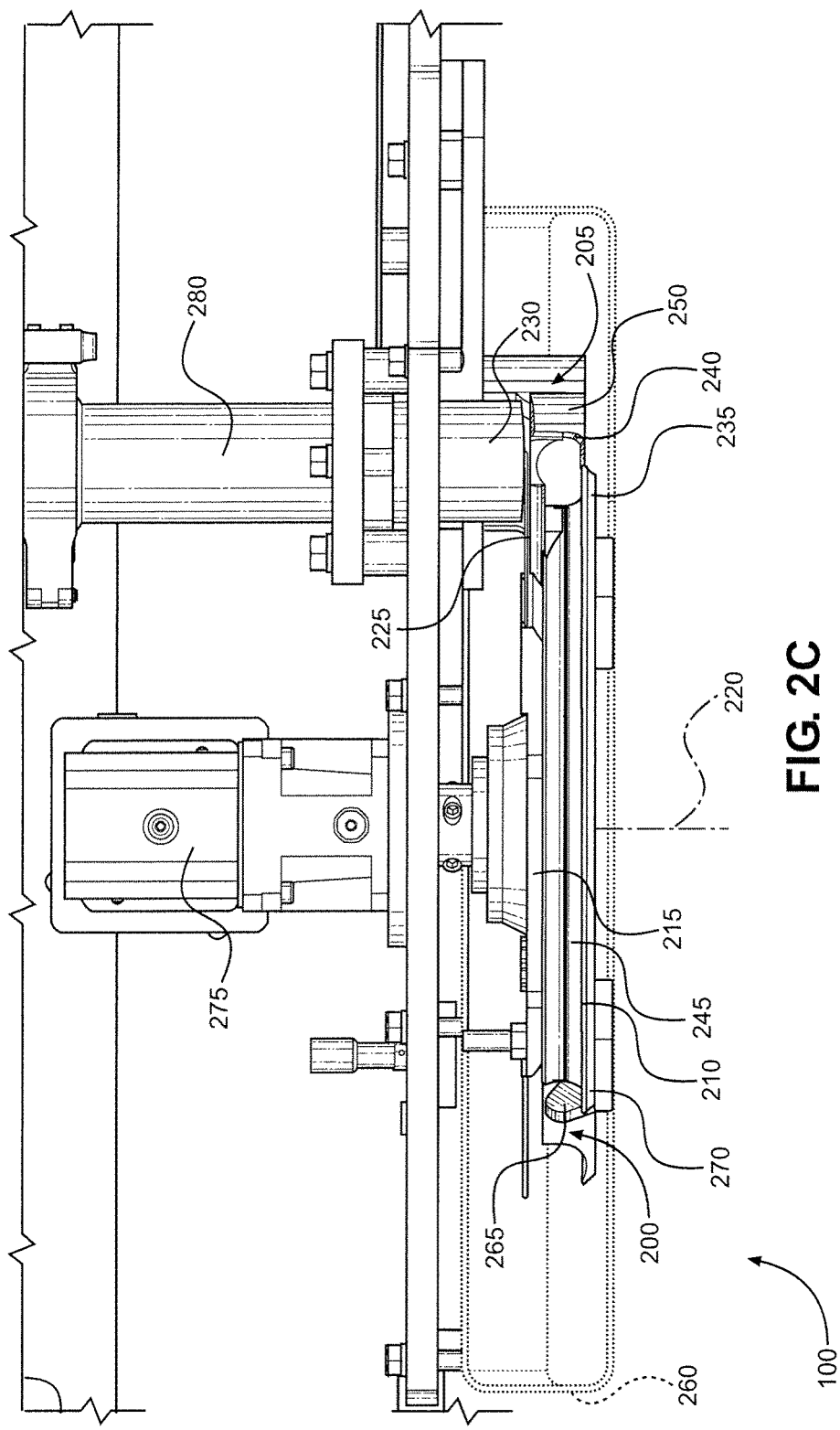

COMBINED FOOD CUTTING AND ROUNDING MACHINE AND METHOD OF CUTTING AND ROUNDING FOOD

BACKGROUND OF THE INVENTION

The present invention pertains to food production and, more particularly, to a machine for cutting and rounding food products.

When producing food products in a commercial setting, it is advantageous to do so as quickly as possible since this typically reduces the per unit cost of production. It is also generally advantageous to use relatively less complex machinery because such machinery tends to be less expensive to purchase and maintain, thereby further reducing the cost of production (other factors being equal). One popular category of food products is bite-sized food products. Although some food products are traditionally served in this format (e.g., sushi), there also exist bite-sized versions of foods traditionally made in larger formats (e.g., cake balls, Caprese skewers). For certain types of bite-sized food products, commercial production typically involves extruding a quantity of edible material, cutting the edible material into pieces and then forming each piece into a desired shape. In connection with the invention, there is seen to exist a need in the art for a relatively simply constructed machine that can be employed to rapidly, effectively and efficiently cut and round edible material.

SUMMARY OF THE INVENTION

The present invention is directed to a combined food cutting and rounding machine and a method of cutting and rounding food with the machine. The machine includes a supply opening through which edible material passes, a stator located adjacent the supply opening and a rotor configured to rotate relative to the stator. The stator includes a stator forming channel. The rotor includes a plurality of rotor forming channels and a plurality of blades, with at least one blade of the plurality of blades being located adjacent to each of the plurality of rotor forming channels. The supply opening, stator and rotor are configured such that, during operation as the rotor rotates relative to the stator, edible material exiting the supply opening is cut by one of the plurality of blades and immediately formed into a ball by simultaneous contact with the stator forming channel and one of the plurality of rotor forming channels. The stator forming channel and each of the plurality of rotor forming channels are arcuate in length. The stator forming channel defines at least a portion of a stator circle, and the plurality of rotor forming channels defines at least a portion of, but less than all, of a rotor circle. The stator and rotor circles are concentric, and the stator circle has a greater diameter than the rotor circle.

In one embodiment, the rotor has a rotational axis, and the plurality of blades is coupled to the plurality of rotor forming channels such that the plurality of rotor forming channels and the plurality of blades rotate together about the rotational axis of the rotor. The supply opening is located such that edible material exits the supply opening in a direction parallel to the rotational axis of the rotor. Each of the plurality of rotor forming channels has a first end and a second end. During operation, the first end contacts edible material exiting the supply opening prior to the second end contacting the edible material. For each of the plurality of rotor forming channels, one of the plurality of blades is located closer to the first end than the second end and either at the first end or between the first and second ends. The stator forming channel and each of the plurality of rotor forming channels are arcuate in cross section such that, when the stator forming channel is located adjacent to one of the plurality of rotor forming channels, the stator forming channel and the one of the plurality of rotor forming channels define between 280 and 350 degrees of a circle. The stator forming channel defines between 20 and 120 degrees of the stator circle, and one of the plurality of rotor forming channels defines between 55 and 160 degrees of the rotor circle. The plurality of rotor forming channels defines between 220 and 320 degrees of the rotor circle.

In another embodiment, the rotor has a rotational axis, and edible material enters a cutting and shaping area in a direction parallel to the rotational axis of the rotor. The cutting and shaping area is defined as the area, after the supply opening, where edible material is cut by one of the plurality of blades and shaped by the stator forming channel and one of the plurality of rotor forming channels.

In yet another embodiment, the plurality of blades is formed separately from the plurality of rotor forming channels, and the rotor further includes a blade holder. The plurality of blades is coupled to the blade holder, and the blade holder is coupled to the plurality of rotor forming channels. The rotor further includes a plurality of forming sections, each of the plurality of forming sections being formed separately and including one of the plurality of rotor forming channels. Alternatively, the rotor further includes a forming wheel, the forming wheel including the plurality of rotor forming channels. The plurality of forming sections or the forming wheel is coupled to the blade holder.

In still another embodiment, the stator forming channel has an upper end adjacent the supply opening and a lower end above a receiving area. During operation, edible material exiting the supply opening contacts the upper end prior to contacting the lower end and entering the receiving area.

In one embodiment, for at least one of the plurality of rotor forming channels, a sweep is located closer to the second end than the first end and either at the second end or between the first and second ends. The sweep is configured to remove edible material from the stator forming channel.

Preferably, the supply opening is an extrusion die, and the extrusion die is polygonal such that edible material exiting the extrusion die is polygonal. Also, S is a number of degrees of the stator circle defined by the stator forming channel, and R is a number of degrees of the rotor circle defined by one of the plurality of rotor forming channels. S:R is preferably between 1:1 and 1:3.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE DRAWINGS

FIG. 2C is a top view of the machine with the guard removed;

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1:
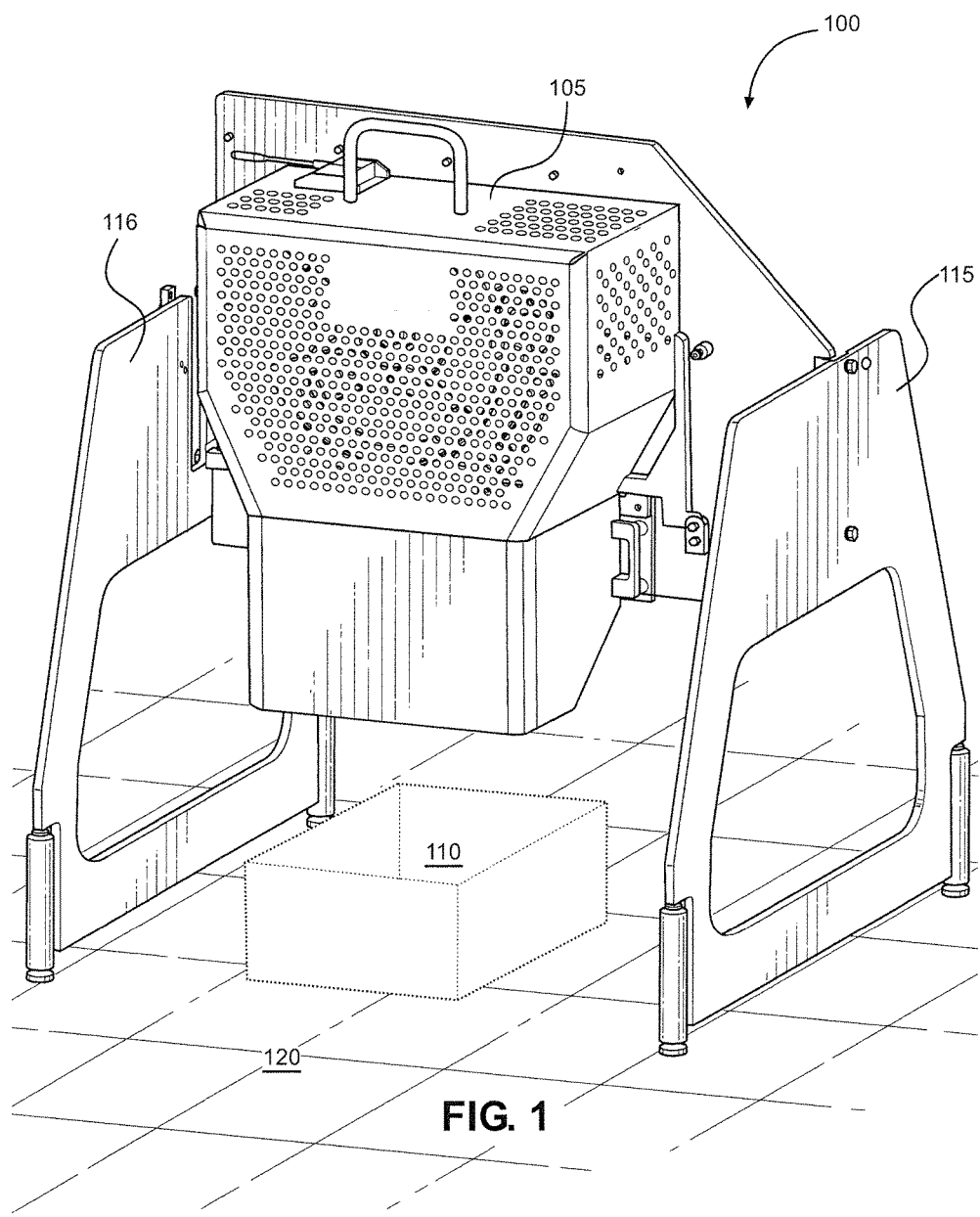
FIG. 1 is a perspective view of a combined cutting and rounding machine in accordance with the present invention.

With initial reference to FIG. 1, there is a shown a combined cutting and rounding machine 100 in accordance with the present invention. Machine 100 includes a guard 105 that prevents a worker, for example, from coming into contact with the moving parts of machine 100. Guard 105 also helps ensure that food products produced by machine 100 are directed to a receiving area 110 below guard 105. Although not specifically illustrated, receiving area 110 can be a container for holding the food products or a conveyor for transporting the food products to another location, for example. In the embodiment shown in FIG. 1, machine 100 includes legs 115 and 116 for supporting machine 100 on a support surface 120. However, other support arrangements can also be used.

Figure 2A:
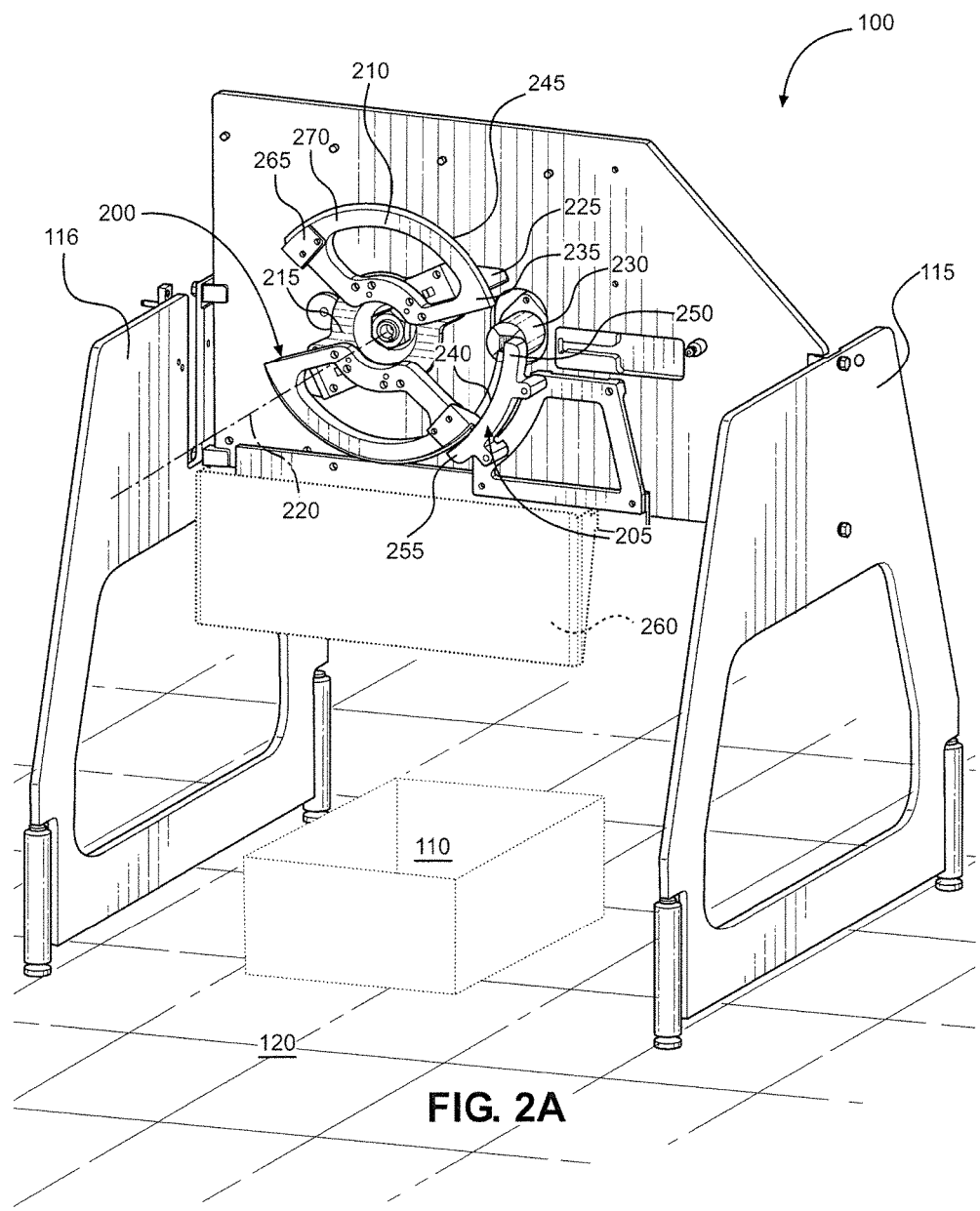
FIG. 2A is a perspective view of the machine with a guard removed.

With reference now to FIG. 2A, machine 100 is shown without guard 105. As a result, a rotor 200 and a stator 205 of machine 100 are more clearly visible. Rotor 200 includes a plurality of forming sections (one of which is labeled 210) and a blade holder 215. Each of the forming sections is coupled to blade holder 215 such that, during operation of machine 100, the forming sections and blade holder 215 rotate together about a rotational axis 220 of rotor 200. A plurality of blades (one of which is labeled 225) is coupled to blade holder 215. Preferably, there is at least one blade 225 for each of the forming sections. The blades 225 are configured to cut edible material exiting an extrusion die 230 of machine 100 as the blades rotate along with the rest of rotor 200. Each time a blade 225 cuts the edible material, a piece of edible material is created. The piece of edible material is then rounded by simultaneous contact with rotor 200 and stator 205. Accordingly, each blade 225 is provided at or near a leading end of a respective forming section, with the leading end being defined as the portion of the forming section that first passes by a given point during rotation of rotor 200. As illustrated, rotor 200 rotates in the clockwise direction, although it should be recognized that machine 100 could be rearranged to accommodate counterclockwise rotation. Therefore, blade 225 is located near a leading end 235 of forming section 210. Preferably, the blades are provided near the leading ends of respective forming sections rather than at the leading ends such that edible material exiting extrusion 230 contacts a forming section prior to being cut.

In order to round the pieces of edible material, stator 205 and each of the forming sections of rotor 200 includes a forming channel. For clarity, the forming channel of stator 205 is termed a stator forming channel (labeled 240), and the forming channels of rotor 200 are termed rotor forming channels (one of which is labeled 245). These forming channels 240 and 245 are best seen in and will be described more fully in connection with the later figures. However, at present, it should be understood that the rounding of the pieces of edible material is the result of compression of a piece of edible material between stator forming channel 240 and one of the rotor forming channels 245 while rotor 200 rotates relative to stator 205. The rotation of rotor 200 causes the piece of edible material to roll down stator forming channel 240 while being compressed, thereby rounding the piece of edible material. Specifically, stator 205 has an upper end 250 and a lower end 255. Upper end 250 is located adjacent extrusion die 230 such that edible material exiting extrusion die 230 is initially brought into contact with upper end 250 when one of the forming sections contacts the edible material during rotation of rotor 200. Continued rotation of rotor 200 causes the edible material to travel down stator 205 to lower end 255, at which point the edible material drops into receiving area 110. An optional guide 260 can be provided to help direct the edible material into receiving area 110 once the edible material drops from stator forming channel 240. Guide 260 can be used in conjunction with guard 105 or in place of a portion thereof. Preferably, extrusion die 230 has a polygonal shape such that edible material passing through extrusion die 230 also has a polygonal shape. This provides better results during rounding than using a circular die, for example. In particular, a polygonal piece of edible material has corners (i.e., vertices), and these corners aid in the formation of the desired spherical shape during compression and rolling of the piece of edible material. Additionally, extrusion die 230 is preferably located such that edible material exits extrusion die 230 in a direction parallel to rotational axis 220, as shown in FIG. 2A, since this facilitates cutting of the edible material by the blades 225. In particular, edible material enters a cutting and shaping area in a direction parallel to rotational axis 220. The cutting and shaping area is defined as the area, after extrusion die 230, where edible material is cut by the blades 225 and shaped by stator forming channel 240 and the rotor forming channels 245.

Rotor 200 can optionally include one or more sweeps (one of which is labeled 265). The sweeps 265 are configured to remove any edible material left behind on stator forming channel 240 after a piece of edible material is rounded. Specifically, the sweeps 265 contact stator forming channel 240 and brush residual edible material therefrom during rotation of rotor 200. Accordingly, each sweep 265 is provided at or near a trailing end of a respective forming section, with the trailing end being defined as the portion of the forming section that last passes by a given point during rotation of rotor 200. For example, sweep 265 is located at a trailing end 270 of forming section 210. Since the benefit provided by the sweeps varies depending on the type of edible material being used, no sweeps need be provided. However, if desired, sweeps can be provided on each forming section or some subset of the forming sections, as appropriate.

Figure 2B:
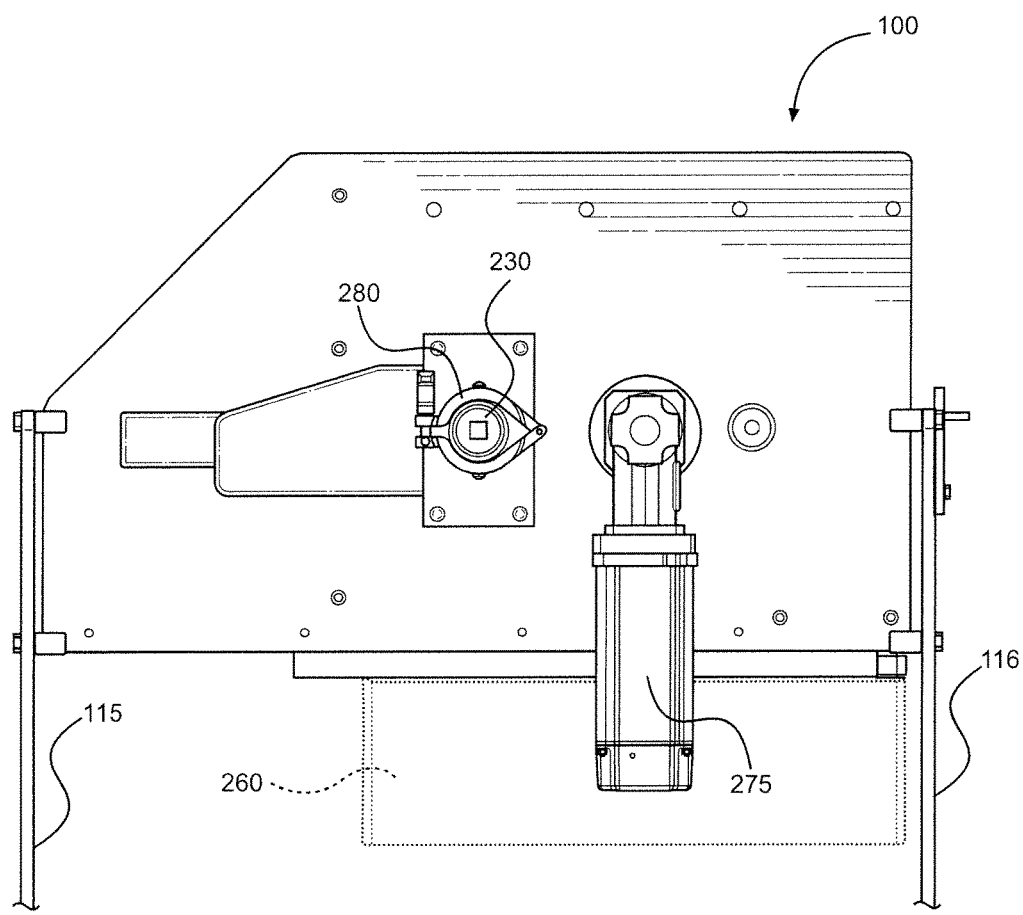
FIG. 2B is a rear view of the machine with the guard removed.

Turning to FIG. 2B, the rear of machine 100 is shown. An electric motor 275 is provided for causing rotation of rotor 200 about rotational axis 220. Nevertheless, it should be recognized that there are other ways, known in the art and usable in connection with the present invention, for causing rotation of rotor 200. In addition, extrusion die 230 is shown from the rear. In use, piping (a portion of which is shown and labeled 280) is connected to extrusion die 230 for delivering edible material to extrusion die 230. However, machine 100 need not include extrusion die 230. Instead, an extrusion die can be placed upstream from machine 100 such that edible material is extruded and then delivered to machine 100 by a conveyor, for example. Therefore, more generally, machine 100 includes a supply opening through which edible material enters the cutting and shaping area of machine 100. This supply opening can be extrusion die 230 but can also be a different opening when a conveyor or some other mechanism is used to supply machine 100 with edible material.

FIG. 2C provides a top view of machine 100 in which stator forming channel 240 and rotor forming channel 245 are more clearly visible. Each rotor forming channel 245 has leading and trailing ends corresponding to the leading and trailing ends of the forming sections. As can be seen in FIG. 2C, edible material passing through piping 280 and exiting extrusion die 230 will come into contact with a leading end of rotor forming channel 245 and be cut by blade 225. The piece of edible material so formed will be compressed between rotor forming channel 245 and stator forming channel 240 while being rolled down the length of stator forming channel 240 as rotor 200 rotates relative to stator 205. The piece of edible material then drops from stator forming channel 240 and is optionally directed to receiving area 110 by guide 260. Also, sweep 265 will brush any residual edible material from stator forming channel 240. This process is then repeated with the other forming section and additional edible material as rotor 200 continues to rotate. The continuous rotation of rotor 200 allows machine 100 to produce rounded pieces of edible material at a high rate. In particular, rotor 200 can rotate at a rate of 800 to 1,200 RPM such that machine 100 produces 1,600 to 2,400 rounded pieces per minute when rotor 200 includes two rotor forming channels. However, it should of course be recognized that lower rates can also be used if desired, e.g., 500 RPM or less.

Figure 3:
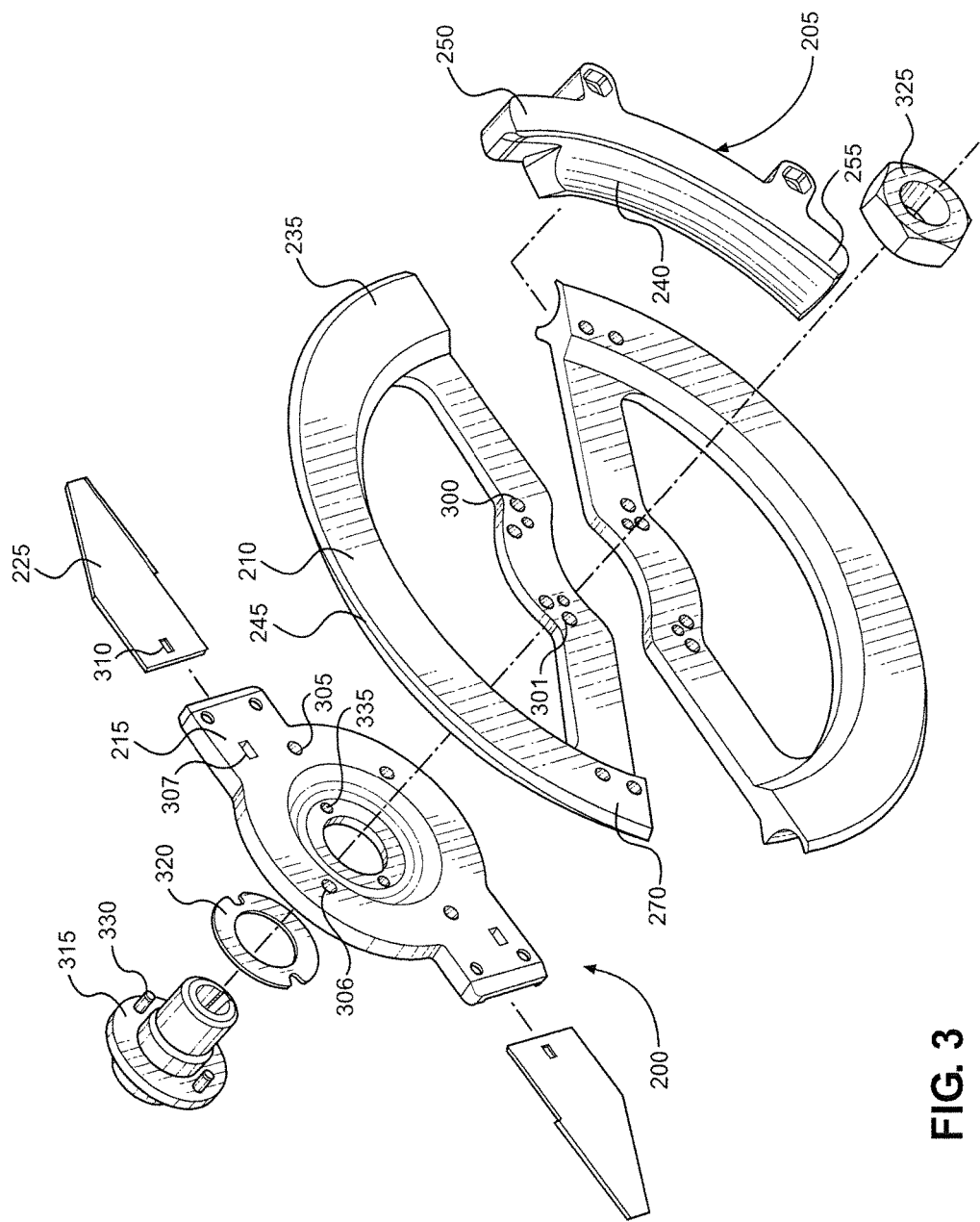
FIG. 3 is an exploded perspective view of a rotor and stator of the machine.

With reference now to FIG. 3, there is shown an exploded view of rotor 200 and stator 205 in which the arcuate nature of the forming channels is more clearly visible. Specifically, the forming channels are arcuate in cross section as can be seen at the leading and trailing ends of the lower forming section and at upper end 250 of stator 205. By arcuate in cross section, it is meant that the shape exposed if a forming channel were cut in a direction perpendicular to rotational axis 220 of rotor 200 is arcuate. For purposes of the present invention, this is the definition of a forming channel being arcuate in cross section. Although the forming channels can be half circles in cross section such that the passage formed when a rotor forming channel is adjacent stator forming channel 240 is a full circle, it is preferred that less than a full circle is formed since this allows excess edible material to escape the passage and thereby prevents jamming of rotor 200. In particular, it is preferred that the forming channels combine to form between 280 and 350 degrees of a circle. However, the circle does not need to be divided evenly between stator forming channel 240 and the rotor forming channels 245. For example, stator forming channel 240 could define 180 degrees of a circle in cross section, while the rotor forming channels defines 140 degrees of the circle in cross section. Also, one of stator forming channel 240 and the rotor forming channels can define more than 180 degrees of the circle. With respect to stator forming channel 240 in particular, there are several advantages to stator forming channel 240 being formed as less than a full circle. During startup of machine 100, a relatively long rope of edible material can be extruded through extrusion die 230 and still be successfully cut and removed without intervention (i.e., by machine 100 alone without the assistance of a human operator). Also, the pieces of edible material formed by machine 100 do not need to travel the entire distance of stator forming channel 240. Instead, the pieces can fall from stator forming channel 240 at any point along stator forming channel 240 (once rotor 200 rotates sufficiently), which prevents the pieces from becoming jammed in stator forming channel 240 and creating a backlog. Also, if a piece of edible material does become jammed in stator forming channel 240, the piece is typically cleared out through contact with a subsequent piece of edible material.

In addition to being arcuate in cross section, each forming channel is arcuate along its length. By arcuate in length, it is meant that the shape traced by edible material moving along a forming channel is arcuate. For purposes of the present invention, this is the definition of a forming channel being arcuate in length. Preferably, stator forming channel 240 defines between 20 and 120 degrees of a circle in length, while each rotor forming channel defines between 55 and 160 degrees of a circle in length. These circles are termed a stator circle and a rotor circle, respectively. The ratio of the length of a rotor forming channel to the length of stator forming channel 240 is preferably between 3:1 and 1:1 since this tends to optimize the use of the lengths of the rotor forming channels and stator forming channel 240 when rolling edible material. However, ratios outside this range can also be used. Also, there are a variety of factors to consider in selecting the lengths of the forming channels. Along these lines, a number of configurations were tested, including "short rotor, short stator", "long rotor, long stator", "long rotor, short stator" and "short stator, long rotor" configurations. In these configurations, the short rotor defined 120 degrees of a circle in length, the long rotor defined 160 degrees of a circle in length, the short stator defined 49.4 degrees of a circle in length and the long stator defined 81.4 degrees of a circle in length. This resulted in the following ratios: 2.43:1.0 for the "short rotor, short stator" configuration; 1.96:1.0 for the "long rotor, long stator" configuration; 3.24:1.0 for the "long rotor, short stator" configuration; and 1.47:1.0 for the "short rotor, long stator" configuration. Of these configurations, the best results were obtained with the "short rotor, long stator" configuration. The rotor forming channels preferably collectively define between 220 and 320 degrees of the rotor circle, i.e., the rotor forming channels preferably collectively define less than all of the rotor circle for timing purposes. However, the rotor forming channels can collectively define a full circle if desired. Although certain preferred arrangements have been set forth, it should be recognized that stator forming channel 240 and the rotor forming channels 245 can provide satisfactory results in a wide variety of cross-sectional and lengthwise configurations. In general though, the stator and rotor circles are concentric, and the stator circle has a larger diameter than the rotor circle, which means that the rotor circle is located inside the stator circle. Also, while machine 100 is shown as including two rotor forming channels, machine 100 can include more than two rotor forming channels depending, for example, on the relative sizes of rotor 200 and stator 205 and the desired ratio of the length of a rotor forming channel to the length of stator forming channel 240.

FIG. 3 also shows the connection of the forming sections to blade holder 215. In particular, the forming sections are coupled to blade holder 215 using a plurality of fasteners (not shown), each of which extends through a first hole located in one of the forming sections and a second hole located in blade holder 215. The blades are coupled to blade holder 215 through the use of detents and corresponding apertures as described in U.S. Pat. No. 6,767,198, which is hereby incorporated by reference. Specifically, blade holder 215 includes a plurality of detents, each detent mating with an aperture formed in one of the blades. Accordingly, once assembled, fasteners would extend through holes 300 and 301 of forming section 210 and holes 305 and 306 of blade holder 215, while a detent 307 mates with an aperture 310, for example. Rotor 200 is coupled to the rest of machine 100 through use of a hub 315, a washer 320 and a nut 325. Rotational motion is transmitted from motor 275 to rotor 200 through hub 315. For this purpose, hub 315 includes pins (one of which is labeled 330) that extend into corresponding holes (one of which is labeled 335) in blade holder 215. Although the forming sections and blade holder 215 are shown as separate pieces, the forming sections and blade holder 215 can be integral, i.e., formed as a single piece. Additionally, rather than provide a separate blade holder, the blades can be directly connected to the forming sections if desired.

Figure 4A:
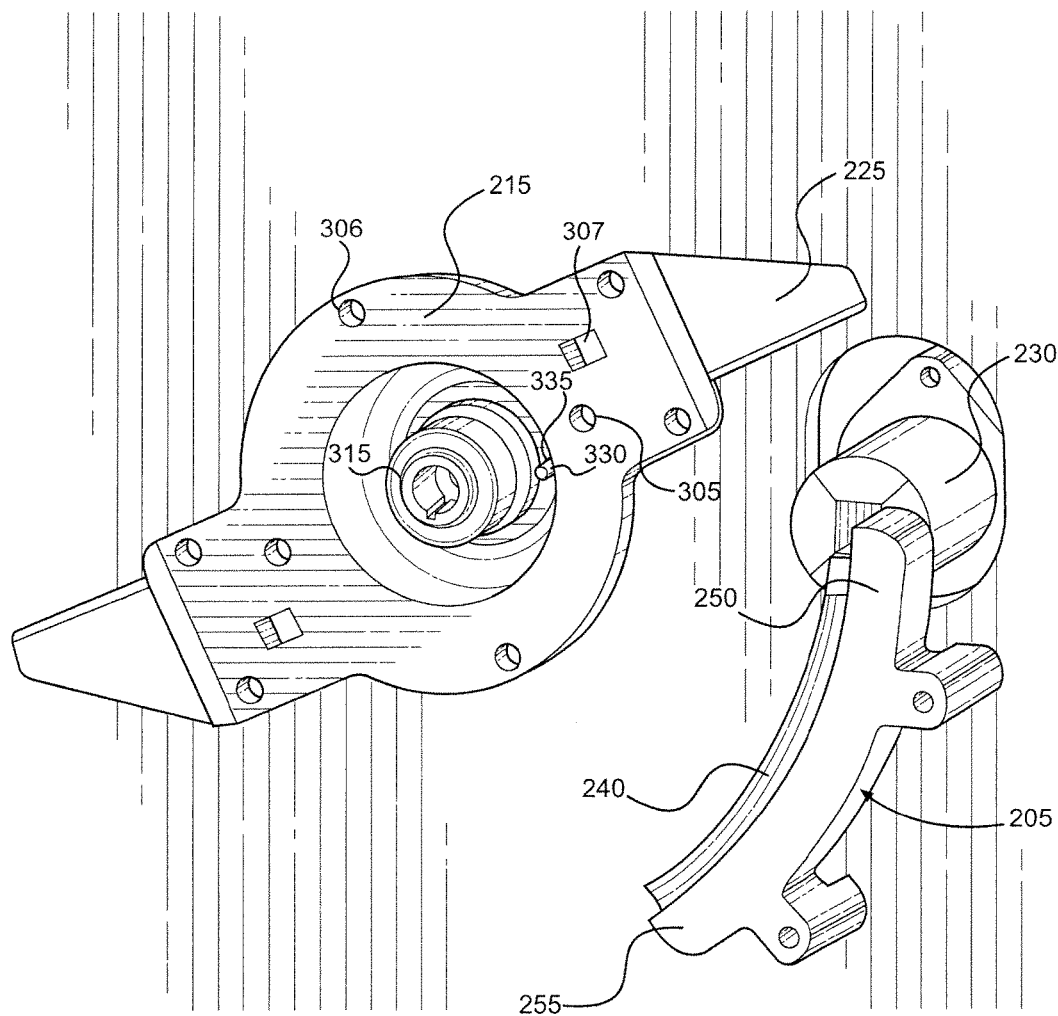
FIG. 4A is a perspective view of the rotor and stator.
Figure 4B:
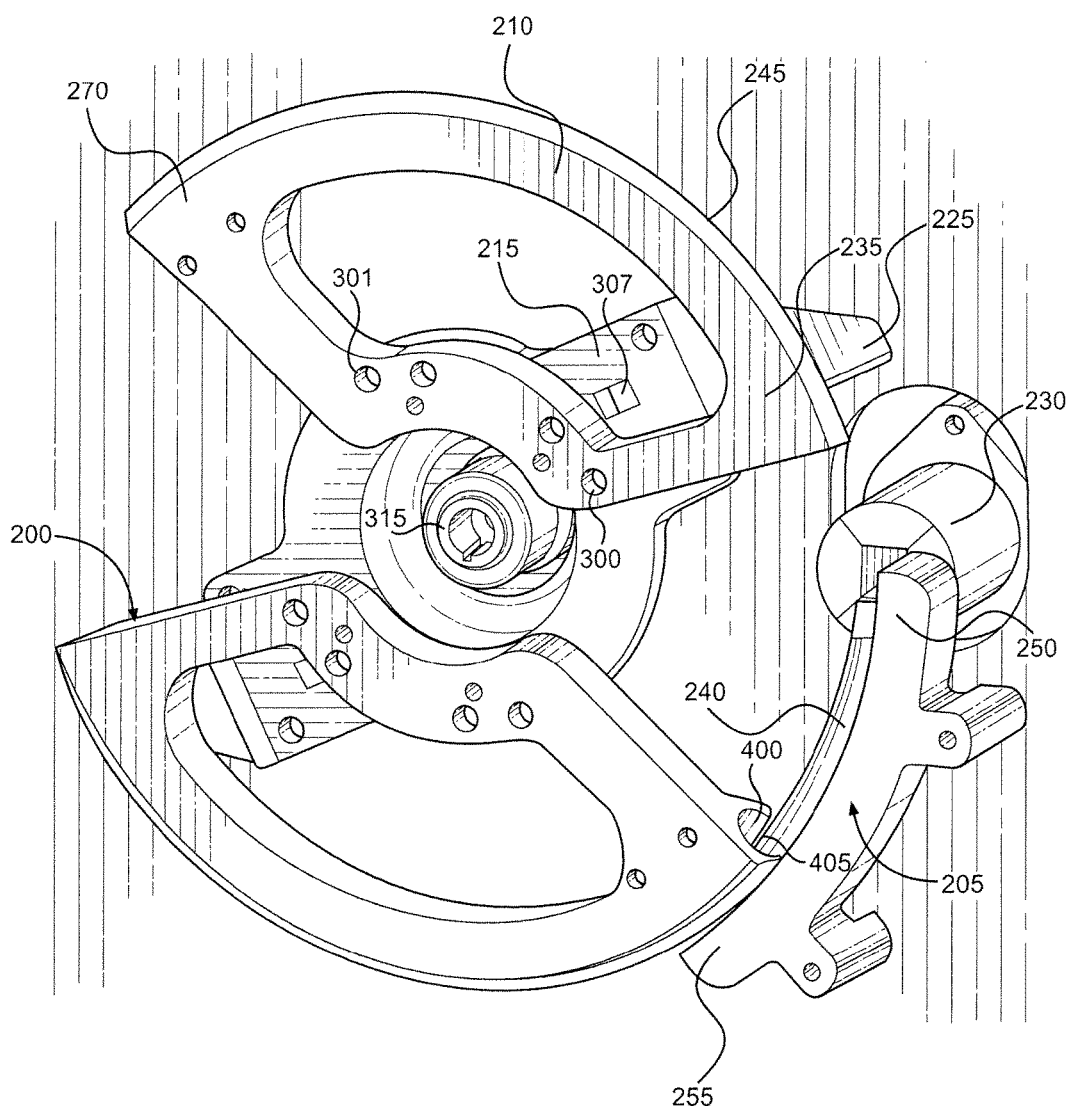
FIG. 4B is a perspective view of a portion of the rotor.

FIG. 4A is a close up view of rotor 200 and stator 205 with the forming sections removed. As a result, the way in which the blades interact with edible material exiting extrusion die 230 is more evident. Blade holder 215 continuously rotates such that the blades alternately pass by extrusion die 230, each pass resulting in a piece of edible material being cut from the edible material exiting extrusion die 230. As previously discussed, these pieces of edible material are then formed into balls using stator forming channels 240 and the rotor forming channels 245. In FIG. 4B, the forming sections are once again present. The perspective of FIG. 4B allows a passage 400, defined by stator forming channel 240 and an adjacent rotor forming channel 245, to be seen. Passage 400 exists whenever one of the rotor forming channels 245 is located adjacent to stator forming channel 240. Since stator forming channel 240 and each of the rotor forming channels 245 are arcuate, passage 400 is circular. The pieces of edible material are formed into balls by being compressed and rolled inside passage 400. In the embodiment shown in FIG. 4B, two small gaps (one of which is labeled 405) exist between stator forming channel 240 and the adjacent rotor forming channel 245. These gaps allow excess material to escape from passage 400, which prevents jamming of rotor 200. However, as previously noted, the size and existence of such gaps vary from embodiment to embodiment.

Figure 5:
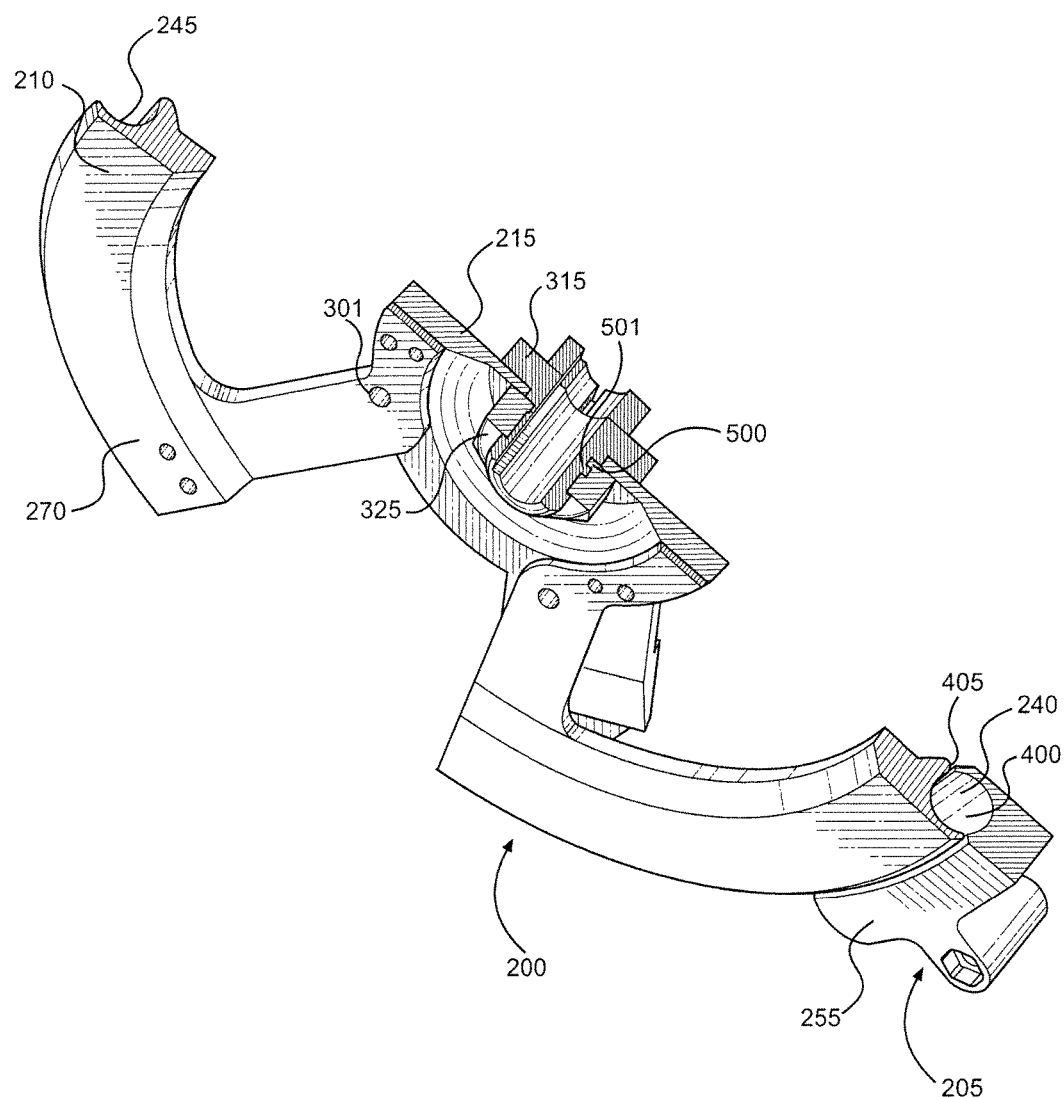
FIG. 5 is a cross section of the rotor and stator.

Turning to FIG. 5, rotor 200 and stator 205 are shown in cross section. As a result, passage 400 and the arcuate shape of the forming channels are both clearly visible. In addition, the connection of nut 325 to hub 315 can be seen. Specifically, first and second interlocking components 500 and 501 are provided on nut 325 and hub 315, respectively. However, it should be recognized that a threaded connection, for example, can be used instead. Along these lines, it should also be recognized that rotor 200 can be secured to machine 100 by structure other than nut 325 and hub 315.

Figure 6:
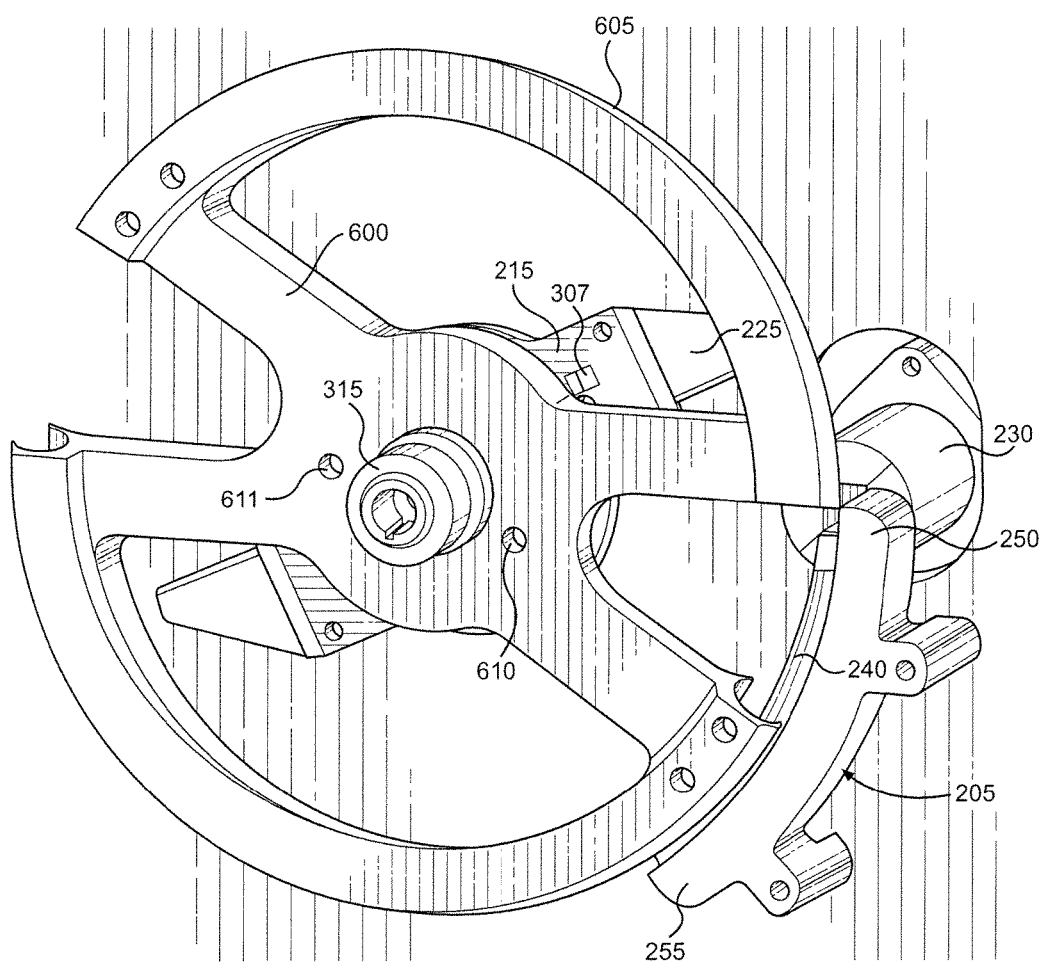
FIG. 6 is a perspective view of an alternative rotor embodiment.

FIG. 6 shows an alternative rotor embodiment. In place of a plurality of forming sections each having a respective rotor forming channel, a single forming wheel 600 is provided that includes a plurality of rotor forming channels (one of which is labeled 605). As with the forming sections, forming wheel 600 is coupled to blade holder 215 using holes 610 and 611 in forming wheel 600, corresponding holes in blade holder 215 (not visible) and a plurality of fasteners (not shown). Alternatively, forming wheel 600 and blade holder 215 can be integral, i.e., formed as a single piece. Additionally, rather than provide a separate blade holder 215, the blades 225 can be directly connected to forming wheel 600 if desired.

Based on the above, it should be readily apparent that the present invention provides a machine that can rapidly cut and round edible material. Although the present invention has been generally described in connection with edible material, the invention has particular applicability for use with making balls from an edible material which is thick and sticky, e.g., having a consistency of a cold peanut butter. For instance, date paste has a thick and sticky consistency, which can make it difficult to work with, while recognizing that overworking this material will quickly result in an extremely thick, unworkable intermediate product. However, it was found that the present invention provides good results when used to cut and then round date paste-based products into balls. In addition, while certain preferred embodiments of the present invention have been set forth, it should be understood that various changes or modifications could be made without departing from the spirit of the present invention. For example, more than two forming channels can be used. Furthermore, even though certain objects have been described as defining a portion of a circle, for purposes of the present invention, this does not require that such objects define a portion of a perfect circle. Instead, the terms "circle" and "circular" are defined as including a margin of error of +/−10%. Specifically, these terms encompass ellipses where the maximum and minimum diameters are each within 10% of the mean diameter. Similarly, the term "parallel" is defined as including a margin of error of 10° such that two objects need not be perfectly parallel. The term "adjacent" is defined as meaning that two objects are within 25 cm of one another. In general, the invention is only intended to be limited by the scope of the following claims.

The invention claimed is:

1. A combined food cutting and rounding machine comprising:
   a supply opening through which edible material passes, wherein the supply opening is an extrusion die and the extrusion die is polygonal such that edible material exiting the extrusion die is polygonal;
   a stator located adjacent the supply opening, the stator including a stator forming channel; and
   a rotor configured to rotate relative to the stator, the rotor including a plurality of rotor forming channels and a plurality of blades, at least one blade of the plurality of blades being located adjacent to each of the plurality of rotor forming channels;
   wherein the supply opening, stator and rotor are configured such that, during operation as the rotor rotates relative to the stator, edible material exiting the supply opening is cut by one of the plurality of blades and formed into a ball by simultaneous contact with the stator forming channel and one of the plurality of rotor forming channels; and
   wherein:
      the stator forming channel and each of the plurality of rotor forming channels are arcuate in length,
      the stator forming channel defines at least a portion of a stator circle,
      the plurality of rotor forming channels defines at least a portion of but less than all of a rotor circle,
      the stator and rotor circles are concentric, and
      the stator circle has a greater diameter than the rotor circle.

2. The machine of claim 1, wherein:
   the rotor has a rotational axis;
   the plurality of blades is coupled to the plurality of rotor forming channels such that the plurality of rotor forming channels and the plurality of blades rotate together about the rotational axis of the rotor;

the supply opening is located such that edible material exits the supply opening in a direction parallel to the rotational axis of the rotor;
each of the plurality of rotor forming channels has a first end and a second end;
during operation, the first end contacts edible material exiting the supply opening prior to the second end contacting the edible material;
for each of the plurality of rotor forming channels, one of the plurality of blades is located closer to the first end than the second end and either at the first end or between the first and second ends;
the stator forming channel and each of the plurality of rotor forming channels are arcuate in cross section such that, when the stator forming channel is located adjacent to one of the plurality of rotor forming channels, the stator forming channel and the one of the plurality of rotor forming channels define between 280 and 350 degrees of a circle;
the stator forming channel defines between 20 and 120 degrees of the stator circle;
one of the plurality of rotor forming channels defines between 55 and 160 degrees of the rotor circle; and
the plurality of rotor forming channels defines between 220 and 320 degrees of the rotor circle.

3. The machine of claim 1, wherein:
the rotor has a rotational axis;
edible material enters a cutting and shaping area in a direction parallel to the rotational axis of the rotor; and
the cutting and shaping area is defined as the area, after the supply opening, where edible material is cut by one of the plurality of blades and shaped by the stator forming channel and one of the plurality of rotor forming channels.

4. The machine of claim 1, wherein:
the plurality of blades is formed separately from the plurality of rotor forming channels;
the rotor further includes a blade holder;
the plurality of blades is coupled to the blade holder; and
the blade holder is coupled to the plurality of rotor forming channels.

5. The machine of claim 4, wherein:
the rotor further includes a plurality of forming sections, each of the plurality of forming sections being formed separately and including one of the plurality of rotor forming channels; or
the rotor further includes a forming wheel, the forming wheel including the plurality of rotor forming channels.

6. The machine of claim 5, wherein the plurality of forming sections or the forming wheel is coupled to the blade holder.

7. The machine of claim 1, wherein:
the stator forming channel has an upper end adjacent the supply opening and a lower end above a receiving area; and
during operation, edible material exiting the supply opening contacts the upper end prior to contacting the lower end and entering the receiving area.

8. The machine of claim 1, wherein:
each of the plurality of rotor forming channels has a first end and a second end;
during operation, the first end contacts edible material exiting the supply opening prior to the second end contacting the edible material;
for at least one of the plurality of rotor forming channels, a sweep is located closer to the second end than the first end and either at the second end or between the first and second ends; and
the sweep is configured to remove edible material from the stator forming channel.

9. The machine of claim 1, wherein:
S is a number of degrees of the stator circle defined by the stator forming channel;
R is a number of degrees of the rotor circle defined by one of the plurality of rotor forming channels;
S:R is between 1:1 and 1:3.

10. The machine of claim 1, wherein the plurality of rotor forming channels defines between 220 and 320 degrees of the rotor circle.

11. The machine of claim 1, wherein:
each of the plurality of rotor forming channels has a first end and a second end;
during operation, the first end contacts edible material exiting the supply opening prior to the second end contacting the edible material; and
for each of the plurality of rotor forming channels, one of the plurality of blades is located closer to the first end than the second end and either at the first end or between the first and second ends.

12. A method of cutting and rounding food with a combined food cutting and rounding machine including:
a supply opening through which edible material passes, wherein the supply opening is an extrusion die and the extrusion die is polygonal such that edible material exiting the extrusion die is polygonal;
a stator located adjacent the supply opening, the stator including a stator forming channel; and
a rotor configured to rotate relative to the stator, the rotor including a plurality of rotor forming channels and a plurality of blades, at least one blade of the plurality of blades being located adjacent to each of the plurality of rotor forming channels;
wherein:
the stator forming channel and each of the plurality of rotor forming channels are arcuate in length,
the stator forming channel defines at least a portion of a stator circle,
the plurality of rotor forming channels defines at least a portion of but less than all of a rotor circle,
the stator and rotor circles are concentric, and
the stator circle has a greater diameter than the rotor circle;
the method comprising:
causing edible material to pass through the supply opening;
rotating the rotor relative to the stator;
cutting the edible material with one of the plurality of blades to create a piece of edible material; and
forming the piece of edible material into a ball by simultaneously contacting the piece with the stator forming channel and one of the plurality of rotor forming channels such that the piece is rolled along the stator forming channel.

13. The method of claim 12, wherein:
the rotor has a rotational axis;
the plurality of blades is coupled to the plurality of rotor forming channels such that rotating the rotor relative to the stator includes rotating the plurality of rotor forming channels and the plurality of blades together about the rotational axis of the rotor;

the supply opening is located such that causing edible material to pass through the supply opening includes causing the edible material to exit the supply opening in a direction parallel to the rotational axis of the rotor;

each of the plurality of rotor forming channels has a first end and a second end;

during operation, the first end contacts the edible material exiting the supply opening prior to the second end contacting the edible material;

cutting the edible material with one of the plurality of blades includes cutting the edible material with a blade located closer to the first end than the second end and either at the first end or between the first and second ends;

the stator forming channel and each of the plurality of rotor forming channels are arcuate in cross section such that, when the stator forming channel is located adjacent to one of the plurality of rotor forming channels, the stator forming channel and the one of the plurality of rotor forming channels define between 280 and 350 degrees of a circle;

the stator forming channel defines between 20 and 120 degrees of the stator circle;

one of the plurality of rotor forming channels defines between 55 and 160 degrees of the rotor circle; and the plurality of rotor forming channels defines between 220 and 320 degrees of the rotor circle.

14. The method of claim 12, wherein:

the rotor has a rotational axis;

causing edible material to pass through the supply opening includes causing the edible material to enter a cutting and shaping area in a direction parallel to the rotational axis of the rotor; and the cutting and shaping area is defined as the area, after the supply opening, where the edible material is cut by the one of the plurality of blades and shaped by the stator forming channel and the one of the plurality of rotor forming channels.

15. The method of claim 12, wherein:

the plurality of blades is formed separately from the plurality of rotor forming channels;

the rotor further includes a blade holder;

the plurality of blades is coupled to the blade holder;

the blade holder is coupled to the plurality of rotor forming channels; and rotating the rotor relative to the stator includes rotating the blade holder relative to the stator.

16. The method of claim 15, wherein:

the rotor further includes a plurality of forming sections, each of the plurality of forming sections being formed separately and including one of the plurality of rotor forming channels; or the rotor further includes a forming wheel, the forming wheel including the plurality of rotor forming channels; and rotating the rotor relative to the stator includes rotating the plurality of forming sections or the forming wheel relative to the stator.

17. The method of claim 16, wherein:

the plurality of forming sections or the forming wheel is coupled to the blade holder; and rotating the rotor relative to the stator includes rotating the blade holder together with the plurality of forming sections or the forming wheel.

18. The method of claim 12, wherein:

the stator forming channel has an upper end adjacent the supply opening and a lower end above a receiving area; and forming the piece of edible material into a ball includes causing the piece of edible material to contact the upper end and then the lower end;

the method further comprising:

causing the piece of edible material to enter the receiving area after the piece of edible material contacts the lower end.

19. The method of claim 12, wherein:

each of the plurality of rotor forming channels has a first end and a second end;

during operation, the first end contacts edible material exiting the supply opening prior to the second end contacting the edible material; and for at least one of the plurality of rotor forming channels, a sweep is located closer to the second end than the first end and either at the second end or between the first and second ends;

the method further comprising:

removing edible material from the stator forming channel with the sweep.

20. The machine of claim 1, wherein:

the rotor has a rotational axis;

the supply opening is located such that edible material exits the supply opening in a direction parallel to the rotational axis of the rotor; and the supply opening is an extrusion die.

21. The method of claim 12, wherein:

the rotor has a rotational axis;

the supply opening is located such that causing edible material to pass through the supply opening includes causing the edible material to exit the supply opening in a direction parallel to the rotational axis of the rotor; and the supply opening is an extrusion die.

* * * * *